United States Patent
Hanna et al.

(10) Patent No.: US 9,950,620 B1
(45) Date of Patent: Apr. 24, 2018

(54) REGENERATIVE AND FRICTION POWER INDICATOR FOR A VEHICLE BRAKING SYSTEM

(71) Applicant: GM GLOBAL TECHNOLOGY OPERATIONS LLC, Detroit, MI (US)

(72) Inventors: Ian L. Hanna, White Lake, MI (US); Bryan W. Shevock, Milford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/409,104

(22) Filed: Jan. 18, 2017

(51) Int. Cl.
*B60K 35/00* (2006.01)
*B60T 17/22* (2006.01)
*G09G 5/14* (2006.01)

(52) U.S. Cl.
CPC ............. *B60K 35/00* (2013.01); *B60T 17/22* (2013.01); *B60K 2350/1076* (2013.01); *G09G 5/14* (2013.01); *G09G 2380/10* (2013.01)

(58) Field of Classification Search
CPC ................................ B60K 35/00; B60T 17/22
See application file for complete search history.

(56) References Cited

U.S. PATENT DOCUMENTS

| 5,615,933 | A | 4/1997 | Kidston et al. |
|---|---|---|---|
| 8,190,344 | B2 | 5/2012 | Krueger et al. |
| 9,238,412 | B2 | 1/2016 | Kidston et al. |
| 2009/0243827 | A1* | 10/2009 | Burke ................... G01D 11/28 340/439 |
| 2013/0049945 | A1 | 2/2013 | Crombez et al. |

\* cited by examiner

*Primary Examiner* — Basil T. Jos
(74) *Attorney, Agent, or Firm* — Lorenz & Kopf, LLP

(57) ABSTRACT

A method for displaying brake power status of a vehicle is disclosed. The method obtains vehicle status data from at least one onboard subsystem, and generates a power indicator based on the status data. The power indicator includes a charge indicator region defined by a stationary charging boundary and by a dynamic transition threshold, a friction brake indicator region adjacent to the charge indicator region and defined by the dynamic transition threshold and by a stationary friction braking boundary, and a real-time power level indicator responsive to the vehicle status data to indicate a position in the charge indicator region or the friction brake indicator region. The transition threshold moves in response to changes in the status data over time, resulting in a moving boundary between the charge indicator region and the friction brake indicator region. The power indicator is displayed on an electronic display element onboard the vehicle.

20 Claims, 5 Drawing Sheets

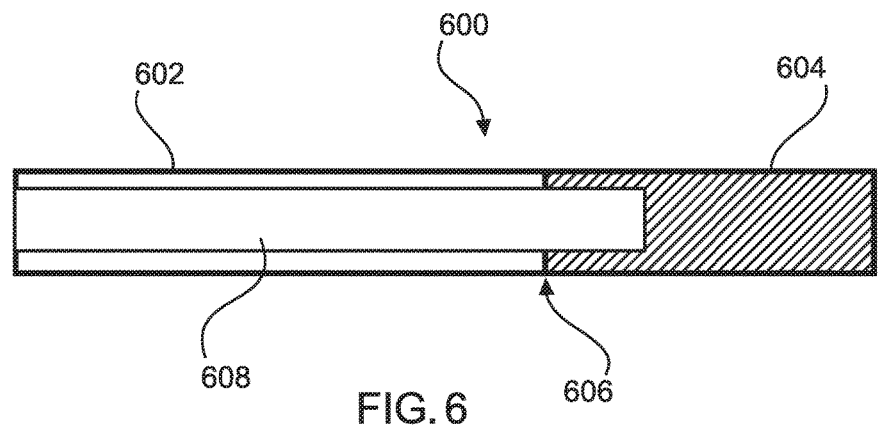
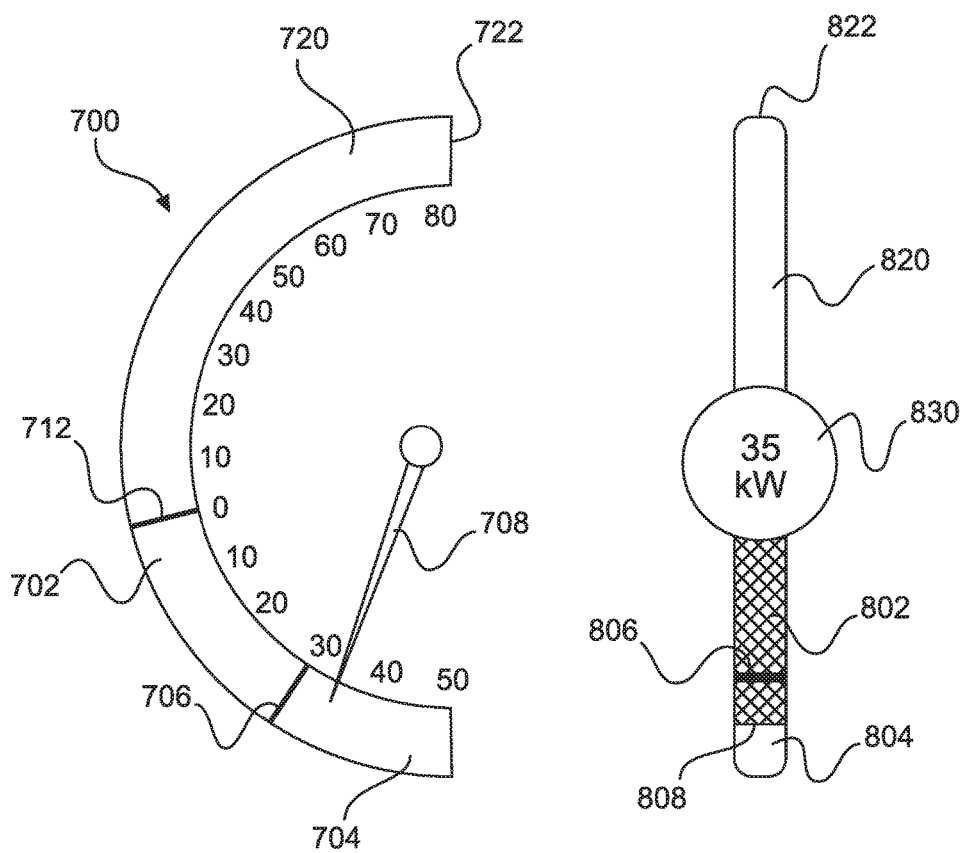

REGENERATIVE AND FRICTION POWER INDICATOR FOR A VEHICLE BRAKING SYSTEM

TECHNICAL FIELD

Embodiments of the subject matter described herein relate generally to vehicle instruments and related displays. More particularly, embodiments of the subject matter relate to a vehicle display system that generates and renders a graphical representation of a braking power indicator.

BACKGROUND

The prior art is replete with various onboard vehicle systems, instrument devices, gauges, and instrument displays. The number and type of vehicle instruments and displays can vary from one vehicle model to another, from one vehicle platform to another, and the like. In this regard, fully electric and hybrid electric vehicles may utilize instrumentation and gauges that are specific to those types of vehicles. For example, fully electric and hybrid electric vehicles may include displays that indicate the operating status of the electric power system, the battery charge level, and the like.

The popularity of hybrid electric, plug-in hybrid, and fully electric vehicles continues to increase over time. Accordingly, the prior art is replete with different systems, control technologies, and processes related to the operation of such vehicles. A hybrid electric vehicle (HEV) includes a rechargeable energy storage system (ESS) which is usually configured as a rechargeable battery or battery pack having a relatively high energy density. An HEV can also include a gasoline, diesel, or alternative fuel internal combustion engine. Other vehicle designs may employ a fuel cell and/or another power source in place of or in conjunction with an internal combustion engine in order to further reduce vehicle emissions and improve the operating range of the vehicle. A fully electric vehicle (EV) only includes an electric drive train, e.g., an electric motor and an ESS.

In certain HEV and EV designs, the drive wheels of the vehicle remain continuously connected to the driveline to enable regenerative braking capability, thus providing a relatively efficient means of capturing useful and otherwise wasted braking energy during coast-down and/or during active braking. As is known in the art, an electric motor/generator (MOGEN) can be selectively operated in such a manner as to allow the device to act as a generator during coast-down or an active regenerative braking event. When acting as a generator, the electric MOGEN recharges the ESS while applying a negative torque to the drive wheels and/or the drive shaft, thus electronically slowing the vehicle. The electric MOGEN likewise can be selectively operated as an electric motor, thus drawing stored electrical energy from the ESS as needed to propel the vehicle. Regeneration during coast-down or active braking contributes to the deceleration of the vehicle. In this regard, negative braking regenerative torque can be applied as a function of brake pedal travel to mimic the characteristics of a standard vacuum-based hydraulic brake system. In practice, braking regenerative torque can be applied as an additive torque to the friction brake torque (which is generated in response to driver actuation of the brake pedal).

Conventional energy/power gauges in HEVs and EVs usually indicate when the ESS is delivering traction power and/or when the ESS is being charged via regenerative braking or coasting. Such power gauges saturate at the maximum charging power level. Consequently, these conventional energy/power gauges do not indicate a dynamic threshold between regenerative braking power and friction braking power.

Accordingly, it is desirable to have an improved methodology and related instrument display system that accurately indicates regenerative and friction braking power in real-time onboard a host vehicle. Furthermore, other desirable features and characteristics will become apparent from the subsequent detailed description and the appended claims, taken in conjunction with the accompanying drawings and the foregoing technical field and background.

BRIEF SUMMARY

A vehicle instrumentation display method is presented herein. An exemplary embodiment of the method obtains vehicle status data from at least one subsystem onboard a vehicle, and generates a graphical regenerative and friction power indicator based on the obtained vehicle status data. The regenerative and friction power indicator includes a charge indicator region defined at a first end by a stationary charging boundary and at a second end by a dynamic transition threshold, and a friction brake indicator region adjacent to the charge indicator region and defined at a first end by the dynamic transition threshold and at a second end by a stationary friction braking boundary. The dynamic transition threshold moves in response to changes in the obtained vehicle status data over time, resulting in a moving boundary between the charge indicator region and the friction brake indicator region. The regenerative and friction power indicator also includes a real-time power level indicator responsive to the obtained vehicle status data to indicate a position in the charge indicator region or in the friction brake indicator region. The method continues by displaying the regenerative and friction power indicator on an electronic display element onboard the vehicle.

Also presented herein is an instrument display system for a vehicle. An exemplary embodiment of the instrument display system includes an electronic display element, a memory storage device, and a processor device communicatively coupled to the memory storage device and to the display element. The memory storage device has computer executable instructions stored therein, which are configurable to be executed by the processor device to perform the method summarized above.

Also presented herein is a tangible and non-transitory computer readable storage medium having executable instructions stored thereon that, when executed by a processor device, are capable of performing a method of displaying braking power information onboard a vehicle. An exemplary embodiment of the method involves obtaining vehicle status data from at least one subsystem onboard the vehicle, and generating a graphical regenerative and friction power indicator based on the obtained vehicle status data. The regenerative and friction power indicator includes a charge indicator region defined at a first end by a stationary charging boundary and at a second end by a dynamic transition threshold, and a friction brake indicator region adjacent to the charge indicator region and defined at a first end by the dynamic transition threshold and at a second end by a stationary friction braking boundary. The dynamic transition threshold moves in response to changes in the obtained vehicle status data over time, resulting in a moving boundary between the charge indicator region and the friction brake indicator region. The power indicator also includes a real-time power level indicator responsive to the obtained vehicle status data to indicate a position in the charge indicator region or in the friction brake indicator region. The method executed by the processor displays the regenerative and friction power indicator on an electronic display element onboard the vehicle.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIGS. 6-8 illustrate alternative embodiments of a graphical regenerative and friction power indicator.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. In certain embodiments, the program or code segments are stored in a tangible processor-readable medium, which may include any medium that can store or transfer information. Examples of a non-transitory and processor-readable medium include an electronic circuit, a semiconductor memory device, a ROM, a flash memory, an erasable ROM (EROM), a floppy diskette, a CD-ROM, an optical disk, a hard disk, or the like.

For the sake of brevity, conventional techniques related to vehicle design, vehicle control systems, regenerative braking systems, electric and hybrid electric drivetrains, vehicle-based electronic control units (ECUs), and vehicle-based networking protocols and related architectures may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Figure 1:
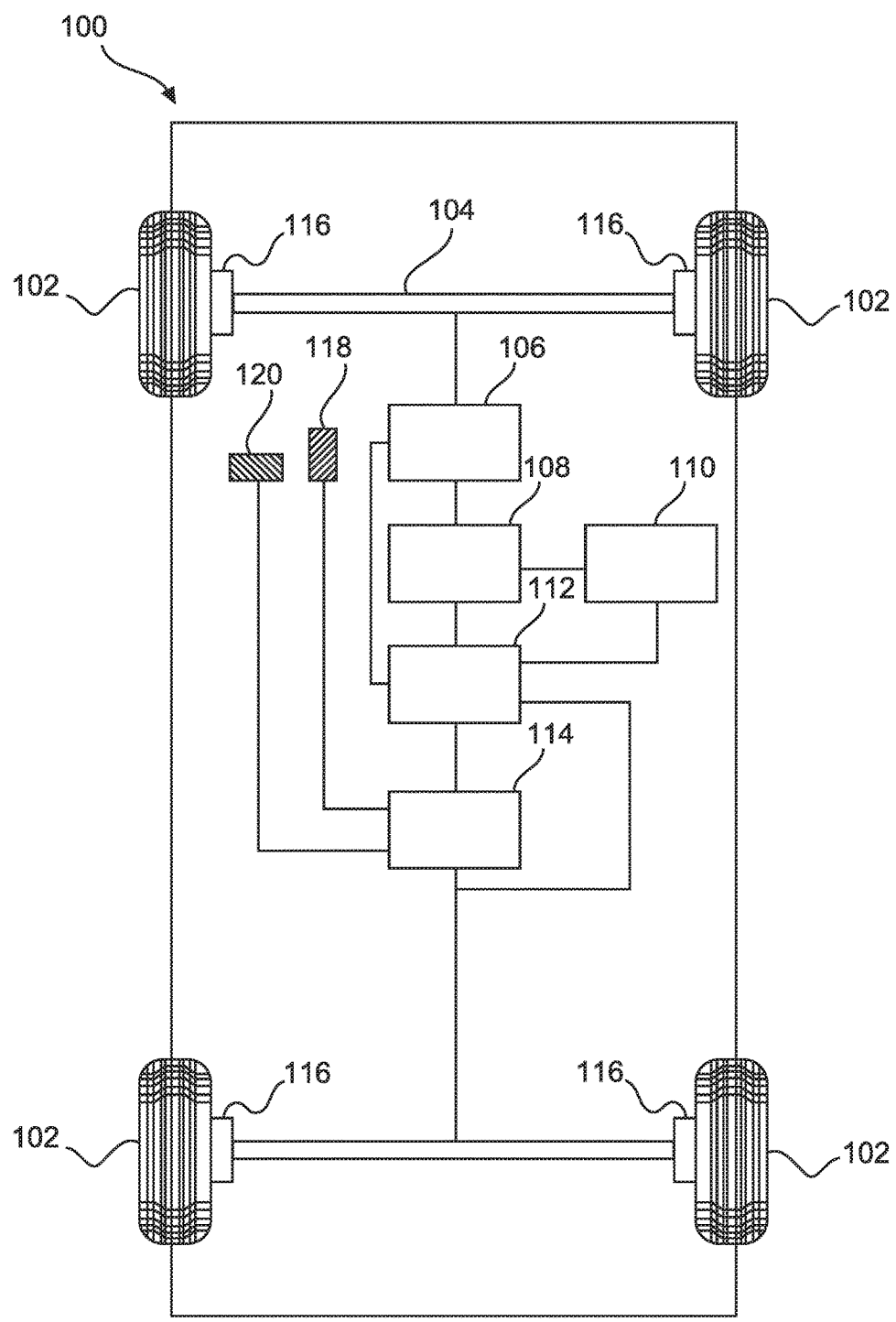
FIG. 1 is a schematic representation of an exemplary embodiment of a vehicle having a regenerative braking system.

FIG. 1 is a schematic representation of an exemplary embodiment of a vehicle 100 having a regenerative braking system. The vehicle 100 may be an HEV, an EV, a plug-in HEV, or any suitably configured vehicle that includes a regenerative braking capability. The vehicle 100 may be a front-wheel drive vehicle, a rear-wheel drive vehicle, an all-wheel drive vehicle, or the like. The non-limiting embodiment illustrated in FIG. 1 represents a front-wheel drive vehicle. The vehicle 100 may include, without limitation: road wheels 102; at least one drive axle 104; a drive system 106; an electric motor/generator (MOGEN) 108; an energy storage system (ESS) 110 for the drive system 106; a computer or processor based control system 112; a number of vehicle sensors 114; a friction braking system 116; an accelerator pedal 118; and a brake pedal 120. The regenerative braking system of the vehicle 100 may be implemented or realized as a combination of various hardware, control, and computer-executable code elements onboard the vehicle 100. For example, the regenerative braking system may include or cooperate with some or all of the following, without limitation: one or more drive axles 104, the drive system 106, the electric MOGEN 108, the control system 112, one or more of the sensors 114, and the friction braking system 116.

FIG. 1 depicts the vehicle 100 in a very simplified manner. It should be appreciated that a practical embodiment of the vehicle 100 will include many additional components, subsystems, and elements that cooperate to provide a variety of conventional and ordinary features and functions. For the sake of brevity and clarity, conventional aspects of the vehicle 100 (which may be unimportant or unrelated to the disclosed subject matter) will not be described in detail here. In this regard, regenerative braking systems and methodologies are described in U.S. Pat. No. 5,615,933 (titled "Electric Vehicle with Regenerative and Anti-Lock Braking"), U.S. Pat. No. 8,190,344 (titled "Optimization of Vehicle Stability and Steering During a Regenerative Braking Event"), and U.S. Pat. No. 9,238,412 (titled "Normalizing Deceleration of a Vehicle Having a Regenerative Braking System"), which are incorporated by reference herein.

The drive system 106 delivers traction power to the drive axle(s) 104. The drive system 106 may include, without limitation, a transmission, a torque converter, and an internal combustion engine (for HEV or plug-in HEV vehicles). For ease of illustration, these components are not depicted in FIG. 1. The drive system 106 is suitably designed and controlled to cooperate with the MOGEN 108 and the ESS 110 such that the road wheels 102 (e.g., the front drive wheels for this example) can be driven by the MOGEN 108 using electric energy stored in the ESS 110. The MOGEN 108, the ESS 110, and/or other features and functions of the vehicle 100 are controlled by the control system 112.

The control system 112, which may be implemented using one or more onboard electronic control modules, is suitably configured to operate as a regenerative control system for the vehicle 100. In certain embodiments, the functionality of the control system 112 is distributed among a plurality of physically distinct electronic control modules of the vehicle 100. For example, the control system 112 may include or cooperate with one or more of the following, without limitation: a central control module; an engine control module; a transmission control module; a power inverter module; a braking control module; a body control module; a powertrain control module; and a battery control module. These, and possibly other, modules include the control logic and functional capabilities as might be necessary to operate the vehicle 100 in the desired manner. If so configured, the control system 112 can provide overarching control and coordination of some or all of the aforementioned modules. For simplicity, the control system 112 is represented as a single block, although separate distinct components may also be deployed in an embodiment of the vehicle 100. In certain embodiments, the control system 112 can be configured to provide or support some or all of the functionality of the instrument display system described in more detail below.

The control system 112 (and any individual control module onboard the vehicle 100) can be configured as a general purpose digital computer generally including a microprocessor, a central processing unit, or other form of processor device, read only memory (ROM), random access memory (RAM), electrically-programmable read only memory (EPROM), high speed clock, analog to digital (A/D) and digital to analog (D/A) circuitry, and input/output circuitry and devices (I/O), as well as appropriate signal conditioning and buffer circuitry. Each set of algorithms resident in the control system 112 (and any individual control module onboard the vehicle 100) or accessible thereby may be stored in ROM and executed as needed to implement the respective functions.

The ESS 110 can be configured as one or more batteries, although other electrical and/or electrochemical energy storage devices having the ability to store electric power and dispense the electric power can be used here. The ESS 110 can be sized based on factors including regenerative braking requirements, application issues related to typical road grade and temperature, and propulsion requirements such as emissions, power assistance, and electric range. Generally, the ESS 110 is a relatively high-voltage direct current (DC) device coupled to a transmission power inverter module (not shown) via sufficiently constructed and routed DC cabling, as will be understood by those of ordinary skill in the art.

The electric MOGEN 108 is mechanically coupled to at least one of the road wheels 102, and is electrically coupled to the ESS 110. The electric MOGEN 108 can operate alternately as a power supplier or as a power generator. When operating as an electric motor or a power supplier, the MOGEN 108, which may be a single unit or multiple units depending on the design of the vehicle 100, supplies power to the drive system 106. When operating as a generator, the MOGEN 108 will receive electrical power from the drive system 106. In this regard, the control system 112 is adapted to route or distribute electrical energy from the MOGEN 108 to the ESS 110 to recharge the ESS 110, and/or to distribute the electrical energy from the ESS 110 to another electrical power unit (not shown), which will be operating as an electric motor at that time.

The vehicle 100 includes a conventional electromechanical or hydraulic friction braking system 116, which utilizes a fluid-actuated pad and/or drum style brake mechanism positioned in proximity to each road wheel 102. The friction braking system 116 provides a frictional braking torque, which can be augmented by an electronic/regenerative braking torque. When a driver or operator of the vehicle 100 depresses a brake pedal 120 to thereby input a force and travel describing a driver-commanded overall braking torque, the friction braking system 116 slows the vehicle 100 via a combination of the friction braking torque and the regenerative braking torque (if available).

Still referring to FIG. 1, the vehicle 100 is also equipped with various sensors 114 that detect or obtain information (referred to herein as vehicle status data) related to the current operating state or condition of the vehicle 100. For example, the sensors 114 may include wheel speed sensors that measure wheel speed and wheel slip data (the vehicle speed, acceleration, and deceleration can be calculated by the control system 112 using the wheel speed data). The sensors 114 may also include sensors that detect the position and/or travel of the brake pedal 120 and the accelerator pedal 118. The sensors 114 may also include sensors that determine the current state of charge of the ESS 110, the charge and/or discharge power of the ESS 110 at any given time, and the temperature of the ESS 110 at any given time. During operation of the vehicle 100, the control system 112 receives real-time vehicle status data by way of input signals corresponding to the different sensors 114, which may be deployed at various locations onboard the vehicle 100. The sensor data can be gathered and processed at any sampling rate, e.g., once every 10 milliseconds.

Figure 2:
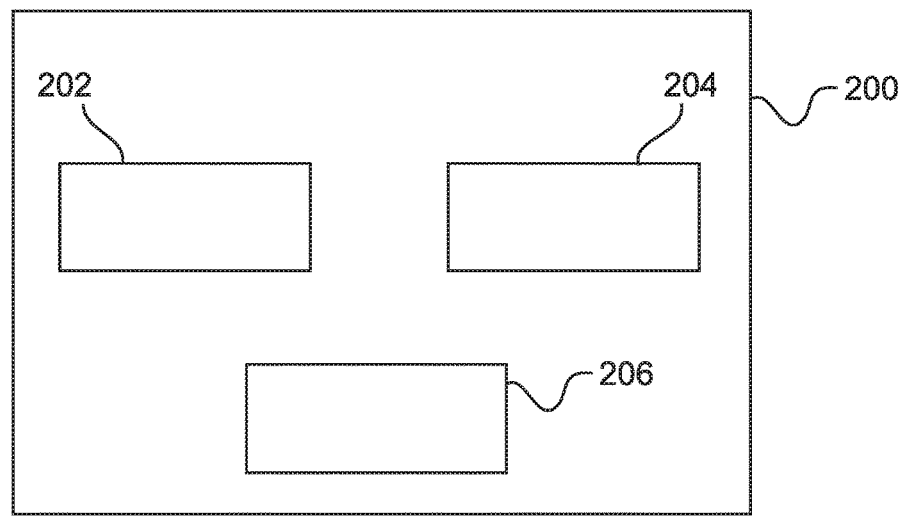
FIG. 2 is a block diagram representation of an embodiment of an electronic control unit suitable for use in a vehicle.

As mentioned previously, the control system 112 and other functional modules of the vehicle 100 can be implemented using one or more ECUs. For example, the vehicle 100 can include any or all of the following ECUs, without limitation: body control module; center stack module; memory seat module; instrument panel cluster module; rear seat entertainment module; lift gate module; amplifier module; transmission module; climate control (HVAC) module; and engine control module. In this context, FIG. 2 is a block diagram representation of an embodiment of an ECU 200 suitable for use in the vehicle 100. Although one ECU 200 can manage the instrumentation and display functionality described herein, various embodiments may employ a plurality of ECUs 200 to support the functionality in a cooperative and distributed manner. The illustrated embodiment of the ECU 200 generally includes, without limitation: at least one processor device 202; at least one computer-readable memory device or storage medium 204; and an input/output module 206 (e.g., a suitably configured transceiver). In practice, the ECU 200 may include additional elements, devices, and functional modules that cooperate to achieve the desired functionality.

The processor device 202 is capable of executing computer executable instructions stored on the storage medium 204, wherein the instructions cause the ECU 200 to perform the various processes, operations, and functions for which it is responsible. In practice, the processor device 202 may be implemented as a microprocessor, a number of discrete processor devices, content addressable memory, an application specific integrated circuit, a field programmable gate array, any suitable programmable logic device, discrete gate or transistor logic, discrete hardware components, or any combination designed to perform the desired functions.

The storage medium 204 (and/or any general purpose memory storage device or storage element) may be utilized to store program code that defines an operating system, a boot loader, or a BIOS for the ECU 200. Moreover, the storage medium 204 may include random access memory that serves as temporary data storage for the processor device 202. In this regard, the processor device 202 can write to and read from the storage medium 204 as needed to support the operation of the ECU 200.

The input/output module 206 may be realized using software, firmware, hardware, processing logic, or any suitable combination thereof. In certain exemplary embodiments, the input/output module 206 is suitably configured to support data communication between the ECU 200 and other modules, ECUs, sensors, or devices onboard the host vehicle 100. The input/output module 206 may also be designed to support data communication with external devices or sources. For example, can be used to receive output data from "external" sensors that are not otherwise coupled to the communication network onboard the vehicle 100.

One or more ECUs onboard the vehicle 100 can be utilized to generate a graphical representation of a regenerative and friction power indicator (e.g., a power gauge) for display on an electronic display element onboard the vehicle 100. The power gauge includes a friction brake region that appears at the of a regenerative braking (charging) region. The demarcation between the charge indicator region and the friction brake indicator region corresponds to a transition threshold that is dynamically rendered in response to changes in the vehicle operating status. The use of a distinct friction braking region displayed adjacent to a regenerative charging region is desirable to convey additional information to the driver. This power gauge will help coach drivers on how to gain maximum efficiency from the regenerative brake system by showing them when they are engaging the friction brake system, and by indicating how much friction power the vehicle is using. Accordingly, the driver can glance at the displayed power gauge to determine how best to optimize regenerative braking maneuvers. Over time, use of the power gauge can lead to more efficient driving habits with higher range and better fuel economy.

Figure 3:
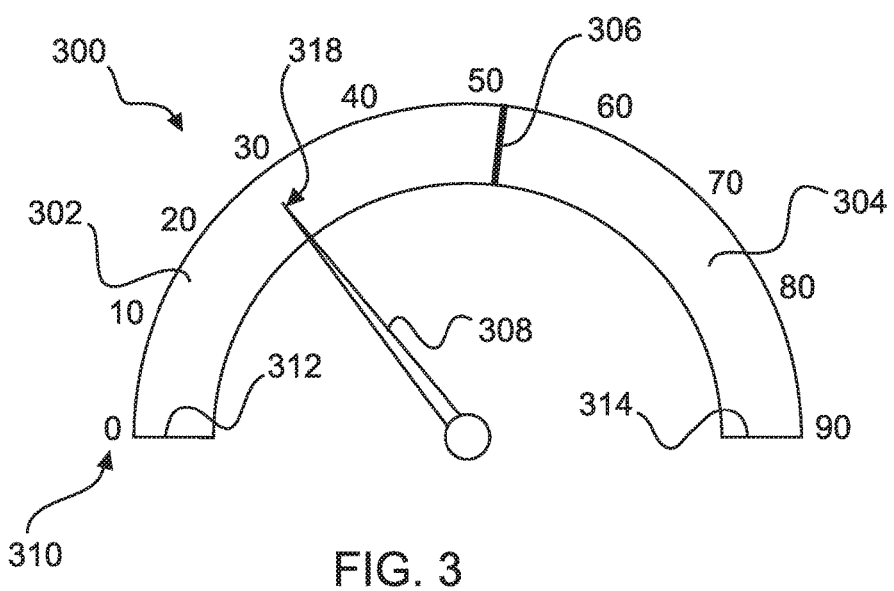
FIG. 3 illustrates a graphical regenerative and friction power indicator arranged in accordance with an exemplary embodiment.

FIG. 3 illustrates a graphical regenerative and friction power indicator 300 arranged in accordance with an exemplary embodiment. It should be appreciated that the power indicator 300 represents merely one possible realization that could be deployed (other embodiments are illustrated in FIGS. 6-8). In this regard, the specific shape, size, display characteristics, and methodology for rendering the dynamic elements of the power indicator 300 can vary from one embodiment to another.

The illustrated power indicator 300 generally includes, without limitation: a charge indicator region 302; a friction brake indicator region 304; a dynamic transition threshold 306 between the charge indicator region 302 and the friction brake indicator region 304; and a real-time power level indicator 308 that moves during a braking operation. Although not always required, the illustrated embodiment of the power indicator 300 also includes a numerical scale 310 to which the power level indicator 308 is calibrated.

The charge indicator region 302 is defined at a first end by a stationary charging boundary 312, and at a second end by the dynamic transition threshold 306. The friction brake indicator region 304 is immediately adjacent to the charge indicator region 302. The friction brake indicator region 304 is defined at a first end by the dynamic transition threshold 306, and at a second end by a stationary friction braking boundary 314. Thus, the two endpoints of the regenerative and friction power indicator 300 are fixed and stationary.

The dynamic transition threshold 306 serves as a shared boundary between the charge indicator region 302 and the friction brake indicator region 304—this shared boundary is dynamic in that it moves in response to changing vehicle conditions, as explained in more detail below. It should be appreciated that FIG. 3 depicts the dynamic transition threshold 306 at one moment in time, wherein the instantaneous value of the dynamic transition threshold 306 is about 52 kW. During operation of the host vehicle, the position of the dynamic transition threshold 306 moves such that the lengths of the charge indicator region 302 and the friction brake indicator region 304 vary over time.

The power level indicator 308 can be realized as a pointer, as depicted in FIG. 3. For this particular embodiment, the pointer has a distal end 318 that is positionable within the charge indicator region 302 or the friction brake indicator region 304. The power level indicator 308 is responsive to the current operating status of the vehicle, and it indicates a calibrated position in the charge indicator region 302 or in the friction brake indicator region 304, depending on the current status. Thus, the current position of the real-time power level indicator 308 indicates an instantaneous regenerative power value when it resides in the charge indicator region 302, or an instantaneous total brake power value when it resides in the friction brake indicator region 304. In this regard, when the indicator 308 resides in the friction brake indicator region 304, it indicates a combination of both regenerative power and friction power). The power level indicator 308 moves in response to the application of brakes such that a gradual application of the brakes will maintain the power level indicator 308 in the charge indicator region 302, and such that a strong or heavy application of the brakes will cause the power level indicator 308 to travel from the charge indicator region 302, across the dynamic transition threshold 306, and into the friction brake indicator region 304. FIG. 3 depicts a moment in time before application of the friction brake system.

Figure 4:
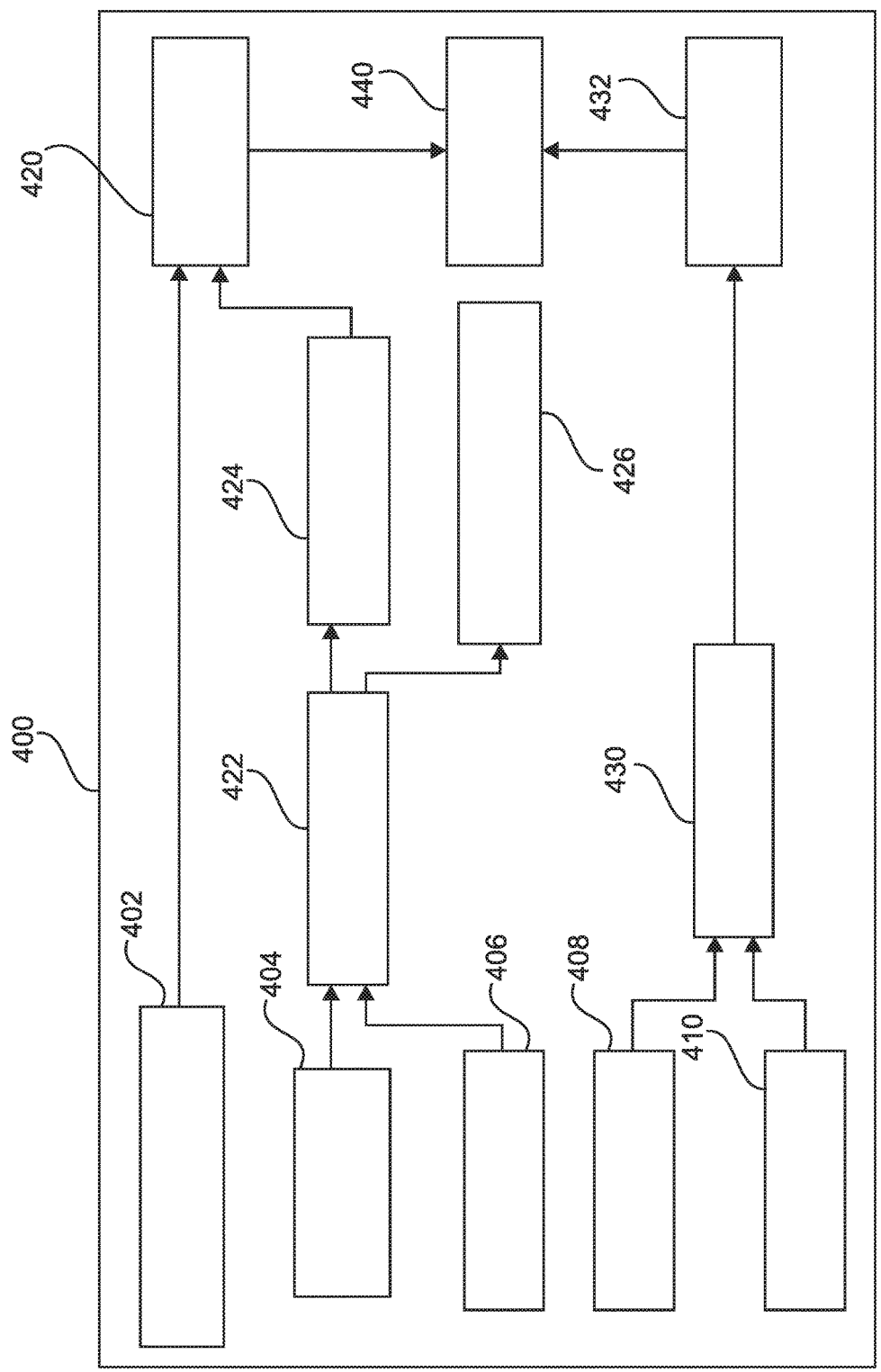
FIG. 4 is is a schematic block diagram representation of an instrument display system that is suitable for deployment in a vehicle.

FIG. 4 is is a schematic block diagram representation of an instrument display system 400 that is suitable for deployment in a vehicle (such as the vehicle 100 shown in FIG. 1). In practice, the system 400 can be realized using one or more ECUs onboard the vehicle, as described above. Accordingly, although not depicted in FIG. 4, the system 400 may include at least one memory storage device and at least one processor device that cooperate to perform the functions and processes related to the generation, rendering, and displaying of the power indicator 300.

The system 400 obtains vehicle status data from various subsystems, devices, sensors, and/or components onboard the vehicle. FIG. 4 depicts different sources of vehicle status data that can be utilized by the system 400 as needed. For this particular embodiment, the vehicle status data includes, without limitation: battery power (charge/discharge) data 402; brake pedal data 404 (e.g., travel information, position information, percentage of pedal activation); vehicle speed or deceleration data 406; battery state of charge data 408; and battery temperature data 410. Other elements and factors can affect the instantaneous available charge power. For example if an anti-lock braking system (ABS) is activated, then the vehicle can revert to friction-only control. Depending on the embodiment, some or all of this vehicle status data can be used to calculate the positions of the real-time power level indicator 308 and the dynamic transition threshold 306 for purposes of rendering the graphical power indicator 300. It should be appreciated that other vehicle status data (which may be present on the onboard data network) can be captured and processed in connection with the generation and rendering of the power indicator 300 if so desired.

The battery power data 402 is utilized to generate the power level indicator position 420. In this regard, the instantaneous position of the real-time power level indicator 308 is influenced by or is otherwise based on the battery power data 402.

The brake pedal data 404 and the vehicle speed or deceleration data 406 are utilized to calculate the requested total brake power 422 (e.g., a commanded brake torque resulting from the driver's engagement of the brake pedal). The calculated total brake power 422 is utilized to calculate a friction brake power command 424 and/or a regenerative brake power command 426, as appropriate for the current operating conditions. The friction brake power command 424 influences the activation of the friction brake system, and the regenerative brake power command 426 influences the operation of the regenerative braking system. As indicated by FIG. 4, the friction brake power command 424 is also utilized to generate the power level indicator position 420. Thus, the instantaneous position of the real-time power level indicator 308 is also influenced by or is otherwise based on the friction brake power command 424. In certain embodiments, the regenerative brake power command 426 can also be used to derive or otherwise influence the position of the real-time power level indicator 308 (the illustrated embodiment does not use the regenerative brake power command 426 in this manner).

The battery state of charge data 408 and the battery temperature data 410 are utilized to calculate the maximum charge power available 430. The calculated maximum charge power available 430 is utilized to calculate the dynamic transition threshold 432 for the current operating conditions. Thus, the instantaneous position of the dynamic transition threshold 306 is influenced by or is otherwise based on a measure of maximum charge power available 430, as determined from the battery state of charge data 408 and the battery temperature data 410.

FIG. 4 schematically depicts an electronic display element 440, which can be implemented in an instrument panel onboard the host vehicle. The electronic display element 440 is controlled and operated to render and display the graphical regenerative and friction power indicator in an appropriate manner. As mentioned above, the displayed characteristics of the power indicator at any moment in time are based on the current values of the power level indicator position 420 and the dynamic transition threshold 432, both of which represent dynamically adjustable elements of the power indicator. Accordingly, the positions of these two elements can be refreshed and updated periodically or at any desired time to accurately render the power indicator. For example, the displayed power indicator can be refreshed every second, every 100 milliseconds, every 10 milliseconds, or the like, to react in real-time or virtually real-time to updated vehicle status data.

Figure 5:
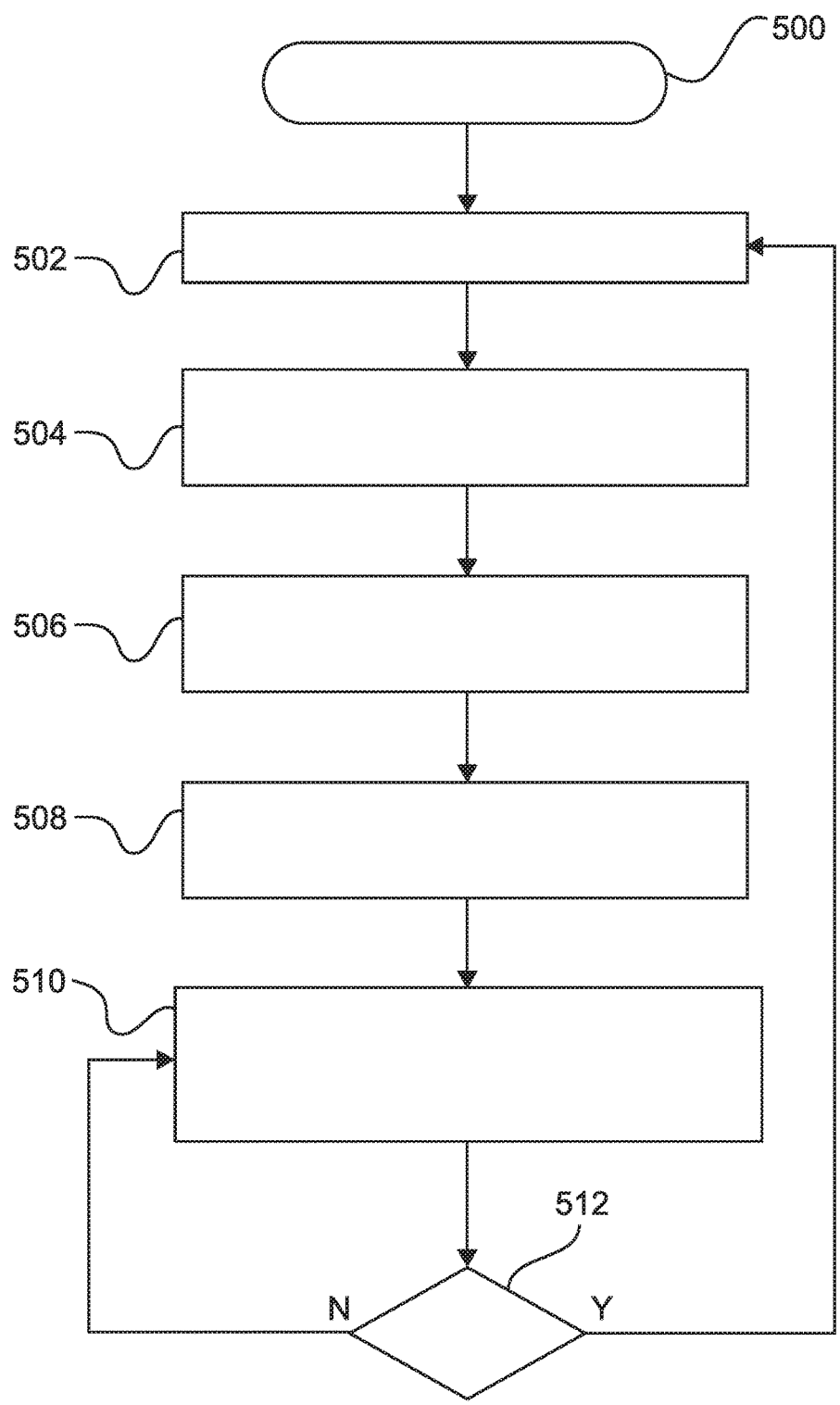
FIG. 5 is a flow chart that illustrates an exemplary embodiment of a vehicle instrument display process.

FIG. 5 is a flow chart that illustrates an exemplary embodiment of a vehicle instrument display process 500. The process 500 can be performed to generate and render a graphical power indicator of the type described herein. The various tasks performed in connection with the process 500 may be performed by software, hardware, firmware, or any combination thereof. For illustrative purposes, the following description of the process 500 may refer to elements mentioned above in connection with FIGS. 1-4. It should be appreciated that the process 500 may include any number of additional or alternative tasks, the tasks shown in FIG. 5 need not be performed in the illustrated order, and the process 500 may be incorporated into a more comprehensive procedure or process having additional functionality not described in detail herein. Moreover, one or more of the tasks shown in FIG. 5 could be omitted from an embodiment of the process 500 as long as the intended overall functionality remains intact.

The process 500 may begin by obtaining vehicle status data from at least one subsystem onboard the host vehicle (task 502). Task 502 accesses or receives the currently available data that is needed to generate and render the regenerative and friction power indicator. In certain embodiments, the required vehicle status data is available on the onboard data network, and task 502 obtains the data using the native data communication and processing protocols of the onboard network. At least some of the obtained vehicle status data is processed to determine a power level value for the current iteration of the process 500 (task 504). In addition, at least some of the obtained vehicle status data is processed to determine a transition threshold value for the current iteration of the process 500 (task 506).

The process 500 continues by generating appropriate display data and information for the graphical regenerative and friction power indicator (task 508). Task 508 generates the display data and information based on the power level value determined at task 504, and based on the transition threshold value determined at task 506. Moreover, task 508 is performed such that the power indicator has the desired features, display characteristics, formatting, and functionality. The generated display data is used to render and display the power indicator on the electronic display element onboard the vehicle (task 510). In connection with such rendering, the process 500 displays the various graphical features, items, and components of the power indicator on the electronic display (see, for example, the embodiment depicted in FIG. 3).

The process 500 is repeated as needed to refresh the displayed representation of the power indicator. Accordingly, if the display is to be updated (the "Yes" branch of query task 512), then the process 500 may be re-entered at task 502 to obtain the current vehicle status data and in response thereto, update the graphical power indicator as rendered on the display element. If the vehicle status data has not been updated (or it is not yet time to refresh the display), then the process 500 may idle and maintain the currently rendered power indicator on the display element. Accordingly, the graphical power indicator can be continuously (or periodically) refreshed during normal operation of the host vehicle to provide a real-time (or near real-time) dynamic visualization. In particular, the graphical representations of the dynamic transition threshold and the power level indicator both move in response to changes in the obtained vehicle status data over time. Movement of the dynamic transition threshold results in a moving boundary between the charge indicator region and the friction brake indicator region, as explained above with reference to FIG. 3.

The graphical regenerative and friction power indicator can be realized in any number of ways, as appropriate to the particular embodiment, vehicle platform, user preferences, or the like. In this regard, FIGS. 6-8 illustrate a number of alternative embodiments of a graphical regenerative and friction power indicator. It should be appreciated that these additional examples are not intended to limit or restrict the scope of application of the subject matter disclosed herein.

FIG. 6 depicts a graphical power indicator 600 that is arranged as a horizontal bar. This particular embodiment includes a charge indicator region 602, a friction brake indicator region 604, a dynamic transition threshold 606, and a power level indictor 608. The dynamic transition threshold 606 corresponds to a shared boundary between the charge indicator region 602 and the friction brake indicator region 604. The dynamic transition threshold 606 moves horizontally in response to changes in the vehicle status data. Similarly, the power level indicator 608 moves horizontally (independently of the dynamic transition threshold 606) in response to changes in the vehicle status data. FIG. 6 depicts a braking state at a time when regenerative charging has reached its limit and friction braking has been activated.

FIG. 7 depicts a graphical power indicator 700 that is arranged as a C-shaped element. This particular embodiment includes a charge indicator region 702, a friction brake indicator region 704, a dynamic transition threshold 706, and a power level indictor 708. The charge indicator region 702 is defined by the dynamic transition threshold 706 at one end, and by a stationary charging boundary 712 at another end. These items are similar to their counterpart elements described above with reference to FIG. 3 and FIG. 6. The power indicator 700 also includes a traction power region 720 having a first end 722 and a second end that is defined by the stationary charging boundary 712. The dynamic transition threshold 706 corresponds to a shared boundary between the charge indicator region 702 and the friction brake indicator region 704. The dynamic transition threshold 706 moves in response to changes in the vehicle status data. Similarly, the power level indicator 708 moves (independently of the dynamic transition threshold 706) in response to changes in the vehicle status data. Notably, the real-time power level indicator 708 is responsive to the obtained vehicle status data to indicate a position in either the charge indicator region 702, the friction brake indicator region 704, or the traction power region 720. Thus, the distal end of the power level indicator 708 will be positioned within the traction power region 720 when the vehicle is using electric traction power (for example, during acceleration). That said, FIG. 7 depicts a braking state at a time when regenerative charging has reached its limit and friction braking has been activated.

FIG. 8 depicts a graphical power indicator 800 that is arranged as a vertical bar. This particular embodiment includes a charge indicator region 802, a friction brake indicator region 804, a dynamic transition threshold 806, and a power level indictor 808. The charge indicator region 802 is defined by the dynamic transition threshold 806 at one end thereof. These items are similar to their counterpart elements described above with reference to FIG. 3, FIG. 6, and FIG. 7. The power indicator 800 also includes a traction power region 820 having a first end 822. The dynamic transition threshold 806 corresponds to a shared boundary between the charge indicator region 802 and the friction brake indicator region 804. The dynamic transition threshold 806 moves in concert with changes in the vehicle status data. Similarly, the power level indicator 808 moves (independently of the dynamic transition threshold 806) in concert with changes in the vehicle status data. Notably, the real-time power level indicator 808 is responsive to the obtained vehicle status data to indicate a position in either the charge indicator region 802, the friction brake indicator region 804, or the traction power region 820. Thus, the distal end of the power level indicator 808 will be positioned within the traction power region 820 when the vehicle is using electric traction power (for example, during acceleration). That said, FIG. 8 depicts a braking state at a time when regenerative charging has reached its limit and friction braking has been activated.

The illustrated embodiment of the power indicator 800 also includes a readout region 830, which is positioned between the charge indicator region 802 and the traction power region 820. Although not always required, the readout region 830 is a stationary element in this particular embodiment. The readout region 830 is a field that contains the numerical value associated with the current state of the power level indicator 808. In this regard, the value displayed in the readout region 830 indicates a charge or brake power when the power level indicator 808 is below the readout region 830, and indicates a traction power when the power level indicator 808 is above the readout region 830. In certain embodiments, the color of the power level indicator 808 and/or the color of the readout region 830 changes in response to the current operating conditions. For example, the color of the power level indicator 808 and/or the color of the readout region 830 may be green when the vehicle is operating in the regenerative charging zone, yellow when the vehicle is using friction brakes, and orange when the vehicle is operating in the traction power zone.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method comprising:
   obtaining vehicle status data from at least one subsystem onboard a vehicle;
   generating a graphical regenerative and friction power indicator based on the obtained vehicle status data, the graphical regenerative and friction power indicator comprising:
   a charge indicator region defined at a first end by a stationary charging boundary and at a second end by a dynamic transition threshold;
   a friction brake indicator region adjacent to the charge indicator region and defined at a first end by the dynamic transition threshold and at a second end by a stationary friction braking boundary, wherein the dynamic transition threshold moves in response to changes in the obtained vehicle status data over time, resulting in a moving boundary between the charge indicator region and the friction brake indicator region; and
   a real-time power level indicator responsive to the obtained vehicle status data to indicate a position in the charge indicator region or in the friction brake indicator region; and
   displaying the regenerative and friction power indicator on an electronic display element onboard the vehicle.

2. The method of claim 1, wherein the vehicle status data comprises: battery power data; brake pedal data; vehicle speed or deceleration data; battery state of charge data; and battery temperature data.

3. The method of claim 1, wherein:
the vehicle status data comprises battery state of charge data and battery temperature data; and
position of the dynamic transition threshold is based on a measure of maximum charge power available, as determined from the battery state of charge data and the battery temperature data.

4. The method of claim 1, wherein the real-time power level indicator comprises a pointer having a distal end positionable within the charge indicator region or the friction brake indicator region.

5. The method of claim 1, wherein position of the real-time power level indicator indicates an instantaneous regenerative power value when in the charge indicator region, or an instantaneous total brake power value when in the friction brake indicator region.

6. The method of claim 1, wherein:
the graphical regenerative and friction power indicator further comprises a traction power region defined at a first end by the stationary charging boundary; and
the real-time power level indicator is responsive to the obtained vehicle status data to indicate a position in the charge indicator region, in the friction brake indicator region, or in the traction power region.

7. An instrument display system for a vehicle, the instrument display system comprising:
an electronic display element;
a memory storage device; and
a processor device communicatively coupled to the memory storage device and to the display element, the memory storage device having computer executable instructions stored therein and configurable to be executed by the processor device to perform a method comprising:
obtaining vehicle status data from at least one subsystem onboard the vehicle;
generating a graphical regenerative and friction power indicator based on the obtained vehicle status data; and
displaying the regenerative and friction power indicator on the electronic display element;
the graphical regenerative and friction power indicator comprising:
a charge indicator region defined at a first end by a stationary charging boundary and at a second end by a dynamic transition threshold;
a friction brake indicator region adjacent to the charge indicator region and defined at a first end by the dynamic transition threshold and at a second end by a stationary friction braking boundary, wherein the dynamic transition threshold moves in response to changes in the obtained vehicle status data over time, resulting in a moving boundary between the charge indicator region and the friction brake indicator region; and
a real-time power level indicator responsive to the obtained vehicle status data to indicate a position in the charge indicator region or in the friction brake indicator region.

8. The instrument display system of claim 7, further comprising at least one source of the vehicle status data onboard the vehicle, wherein the at least one source is configured to provide battery power data, brake pedal data, vehicle speed or deceleration data, battery state of charge data, and/or battery temperature data.

9. The instrument display system of claim 7, wherein:
the vehicle status data comprises battery state of charge data and battery temperature data; and
position of the dynamic transition threshold is based on a measure of maximum charge power available, as determined from the battery state of charge data and the battery temperature data.

10. The instrument display system of claim 7, wherein the real-time power level indicator comprises a pointer having a distal end positionable within the charge indicator region or the friction brake indicator region.

11. The instrument display system of claim 7, wherein position of the real-time power level indicator indicates an instantaneous regenerative power value when in the charge indicator region, or an instantaneous total brake power value when in the friction brake indicator region.

12. The instrument display system of claim 7, wherein:
the graphical regenerative and friction power indicator further comprises a traction power region defined at a first end by the stationary charging boundary; and
the real-time power level indicator is responsive to the obtained vehicle status data to indicate a position in the charge indicator region, in the friction brake indicator region, or in the traction power region.

13. The instrument display system of claim 7, further comprising an electronic control unit onboard the vehicle, wherein the memory storage device and the processor device are implemented in the electronic control unit.

14. A vehicle comprising the instrument display system of claim 7.

15. A tangible and non-transitory computer readable storage medium having executable instructions stored thereon that, when executed by a processor device, are capable of performing a method of displaying braking power information onboard a vehicle, the method comprising:
obtaining vehicle status data from at least one subsystem onboard the vehicle;
generating a graphical regenerative and friction power indicator based on the obtained vehicle status data, the graphical regenerative and friction power indicator comprising:
a charge indicator region defined at a first end by a stationary charging boundary and at a second end by a dynamic transition threshold;
a friction brake indicator region adjacent to the charge indicator region and defined at a first end by the dynamic transition threshold and at a second end by a stationary friction braking boundary, wherein the dynamic transition threshold moves in response to changes in the obtained vehicle status data over time, resulting in a moving boundary between the charge indicator region and the friction brake indicator region; and
a real-time power level indicator responsive to the obtained vehicle status data to indicate a position in the charge indicator region or in the friction brake indicator region; and
displaying the regenerative and friction power indicator on an electronic display element onboard the vehicle.

16. The storage medium of claim 15, wherein the vehicle status data comprises: battery power data; brake pedal data; vehicle speed or deceleration data; battery state of charge data; and battery temperature data.

17. The storage medium of claim 15, wherein:
- the vehicle status data comprises battery state of charge data and battery temperature data; and
- position of the dynamic transition threshold is based on a measure of maximum charge power available, as determined from the battery state of charge data and the battery temperature data.

18. The storage medium of claim 15, wherein the real-time power level indicator comprises a pointer having a distal end positionable within the charge indicator region or the friction brake indicator region.

19. The storage medium of claim 15, wherein position of the real-time power level indicator indicates an instantaneous regenerative power value when in the charge indicator region, or an instantaneous total brake power value when in the friction brake indicator region.

20. The storage medium of claim 15, wherein:
- the graphical regenerative and friction power indicator further comprises a traction power region defined at a first end by the stationary charging boundary; and
- the real-time power level indicator is responsive to the obtained vehicle status data to indicate a position in the charge indicator region, in the friction brake indicator region, or in the traction power region.

\* \* \* \* \*